US012302060B2

(12) United States Patent
Pawlak

(10) Patent No.: US 12,302,060 B2
(45) Date of Patent: May 13, 2025

(54) METHODS AND APPARATUS TO DETERMINE A LOCATION OF AN AUDIO SOURCE

(71) Applicant: Intel Corporation, Santa Clara, CA (US)

(72) Inventor: Krzysztof Pawlak, Gdynia (PL)

(73) Assignee: Intel Corporation, Santa Clara, CA (US)

( * ) Notice: Subject to any disclaimer, the term of this patent is extended or adjusted under 35 U.S.C. 154(b) by 807 days.

(21) Appl. No.: 17/359,532

(22) Filed: Jun. 26, 2021

(65) Prior Publication Data

US 2021/0329373 A1 Oct. 21, 2021

(51) Int. Cl.
*H04R 3/00* (2006.01)
*H04R 1/40* (2006.01)

(52) U.S. Cl.
CPC ............. *H04R 1/406* (2013.01); *H04R 3/005* (2013.01); *H04R 2201/401* (2013.01)

(58) Field of Classification Search
CPC .. H04R 1/406; H04R 3/005; H04R 2201/401; H04R 1/44; H04R 29/00
USPC .......................................................... 381/92
See application file for complete search history.

(56) References Cited

U.S. PATENT DOCUMENTS 9,560,446 B1 * 1/2017 Chang .................... H04R 1/406
2002/0097885 A1 * 7/2002 Birchfield .............. H04R 1/406 381/92
2015/0156578 A1 * 6/2015 Alexandridis ......... H04R 3/005 381/92

OTHER PUBLICATIONS

Kwon, B et al. "Analysis of the GCC-PHAT technique for multiple sources", IEEE.org, retrieved Jun. 15, 2021, Abstract.
Anguera, X. "GCC-PHAT Cross-Correlation", retrieved from: http://www.xavieranguera.com/phdthesis/node92.html, 2 pages.
Gccphat, Generalized cross-correlation, Syntax, retrieved from: https://www.mathworks.com/help/phased/ref/gccphat.html, 7 pages.
"Passive Source Localization Employing Intersecting spherical surfaces from time-of-arrival differences," IEEE Transactions On Acoustics, Speech, and Signal Processing, vol. ASSP-35, No. 8, Aug. 1987, pp. 1223-1225.
Brutti, A. et al. "Multiple Source Localization Based on AcousticMap De-Emphasis", EURASIP Journal on Audio, Speech, and Music Processing, vol. 2010, Article ID 147495, 17 pages.

* cited by examiner

*Primary Examiner* — Carolyn R Edwards
*Assistant Examiner* — Friedrich Fahnert
(74) *Attorney, Agent, or Firm* — Hanley, Flight & Zimmerman, LLC

(57) ABSTRACT

Methods, apparatus, systems, and articles of manufacture to determine a physical location of an audio source are disclosed. One such apparatus includes a microphone set identifier to identify ordered microphone sets from a plurality of microphones and an estimated source location calculator to calculate estimated source locations for the audio source. The apparatus further includes an estimation error calculator to calculate respective estimation errors for corresponding ones of the estimated source locations. A likelihood calculator calculates respective likelihood values for corresponding ones of the estimated source locations and a first one of the estimated source location associated with a selected one of the likelihood values is used to represent the physical location of the audio source.

20 Claims, 9 Drawing Sheets

FIG. 5A
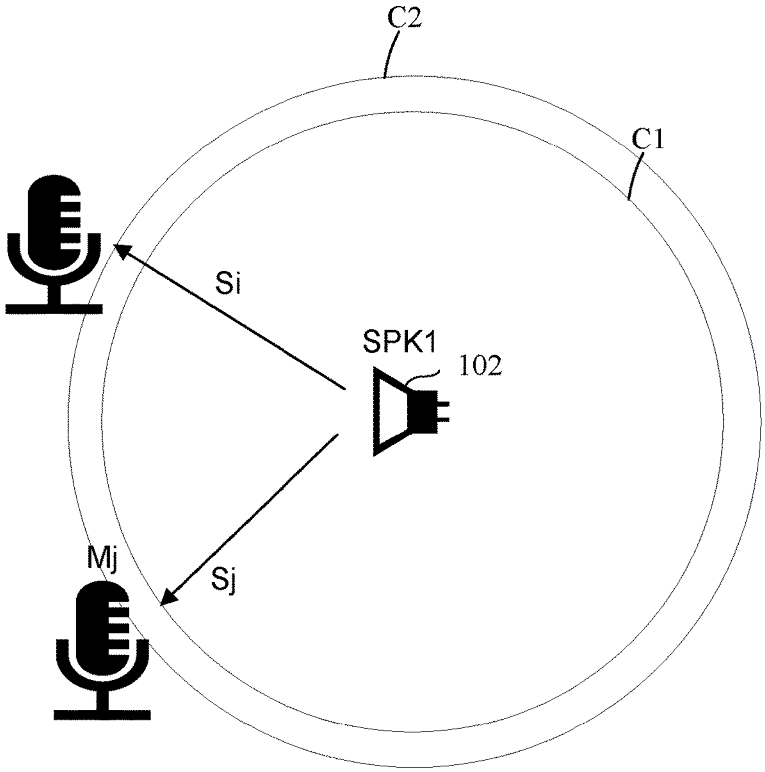
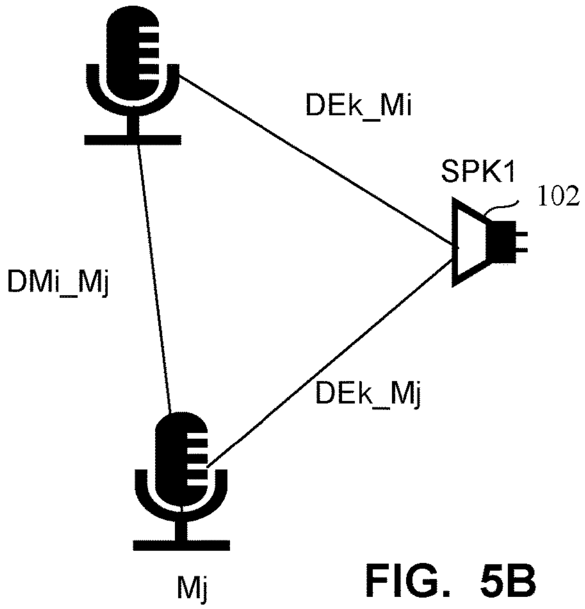
FIG. 5B

METHODS AND APPARATUS TO DETERMINE A LOCATION OF AN AUDIO SOURCE

FIELD OF THE DISCLOSURE

This disclosure relates generally to audio source location and, more particularly, to methods and apparatus to determine a physical location of an audio source.

BACKGROUND

In recent years, audio monitoring systems have been evolving and applications of such systems are burgeoning. Such audio monitoring systems are deployed in both outdoor and indoor settings and can include techniques to determine a location of an audio source.

BRIEF DESCRIPTION OF THE DRAWINGS

FIG. 5A is an illustration of the audio source, a first microphone (Mi) and a second microphone (Mj), a first distance (DGCC_i_j) that is calculated based on time-difference-of-arrival information and a second distance (DMi_DMj) that is calculated based known locations of the microphone, Mi, and the microphone, Mj.

FIG. 5B is an illustration of an estimated source location, Ek, a microphone Mi, a microphone Mj, and a first distance (DE_Mi), and a second distance (DEk_Mj) between the estimated source location Ek and the locations of the microphones Mi and Mj, respectively.

Figure 1:
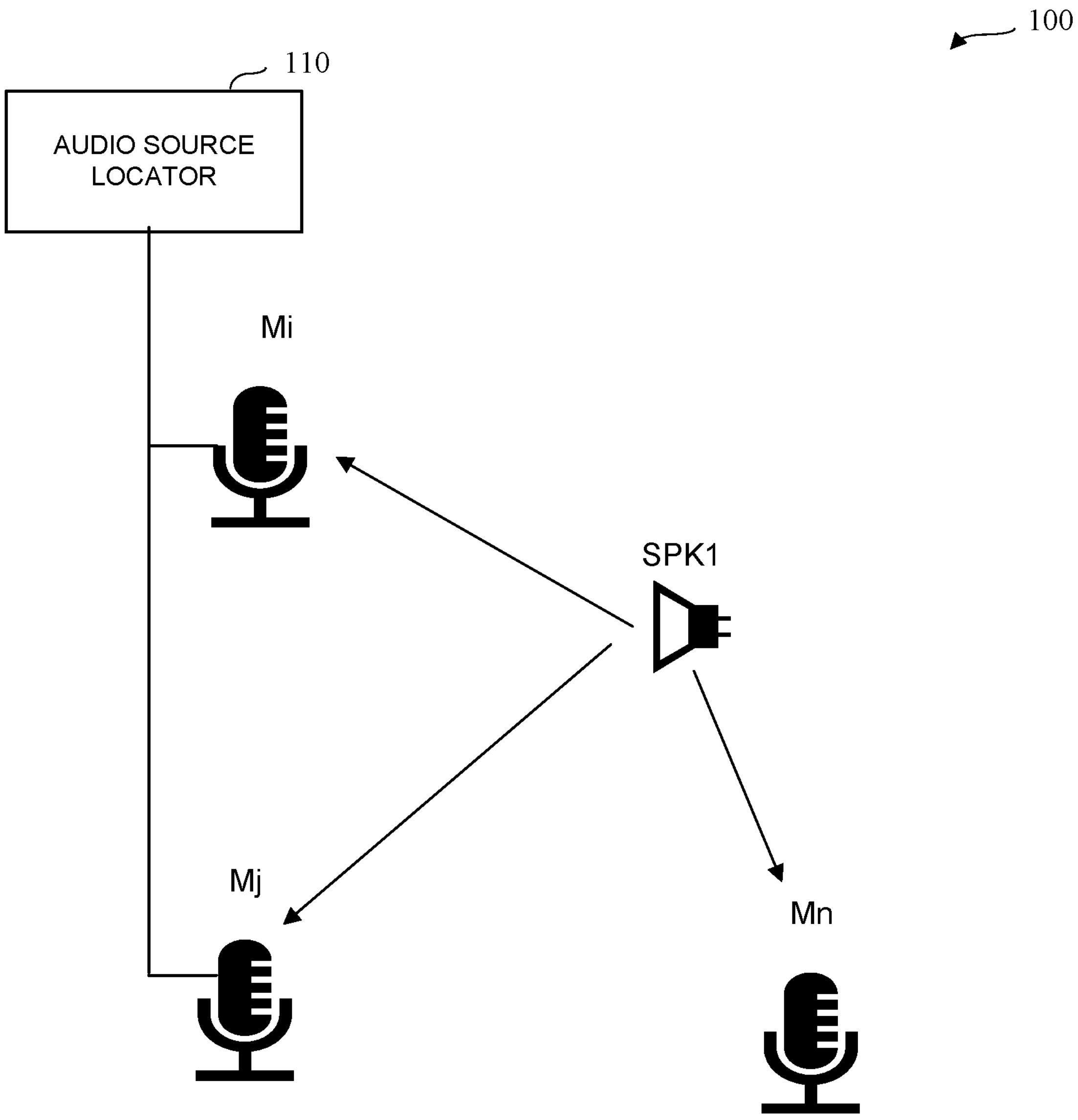
FIG. 1 is an illustration of an audio source location system including a number of microphones (N), an audio source (e.g., a speaker), and an audio source locator to determine a physical location of the audio source in accordance with the teachings disclosed herein.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Known methods of identifying/estimating a location of an audio source include using information derived from audio signals captured at microphones located near the audio source Specifically, time difference of arrival data generated based on the captured audio signals is used to identify a location of an audio source. Additionally, information generated based on the locations of the microphones is also used. The information generated by such methods includes estimated source locations from which a mean value can be derived. The mean value of the estimated source location is used to represent the actual location of the audio source. Unfortunately, in many instances, the results generated using such methods/techniques are fairly inaccurate and, as such, not a useful predictor of the actual location of the audio source.

The example apparatus and methods disclosed herein calculate estimated source locations of an audio source and then create estimation error values for each estimated source location. The estimated error values are used to calculate a likelihood value for each estimated source location. The estimated source location associated with the highest likelihood value is used to represent the actual, physical location of the audio source.

FIG. 1 illustrates of an audio source location system 100 used to identify a location of an audio source. The audio source location system 100 includes an example audio source 102, a plurality (n) of example microphones Mi, Mj . . . Mn, and an example audio source locator 110. In the examples disclosed herein, the number (n) of microphones Mi, Mj . . . Mn exceeds 4 (e.g., n>4). Each of the example microphones Mi, Mj . . . Mn are placed at various, known locations in an environment (indoor, outdoor, underwater, etc.) in which the audio source 102 (e.g., an audio speaker) is present. In some examples, the locations at which the microphones are placed are determined such that none of the microphones are at locations that are co-planar or co-linear.

Although the example audio source 102 (e.g., SPK 1) of FIG. 1 is illustrated using a speaker, the audio source can be anything or device that generates sound, including for example, a person, a vehicle, a siren, a whistle, an animal call, etc. The example audio source locator 110 uses information collected by the microphones Mi, Mj . . . Mn to determine estimated locations at which the audio source 102 may be located.

Figure 2:
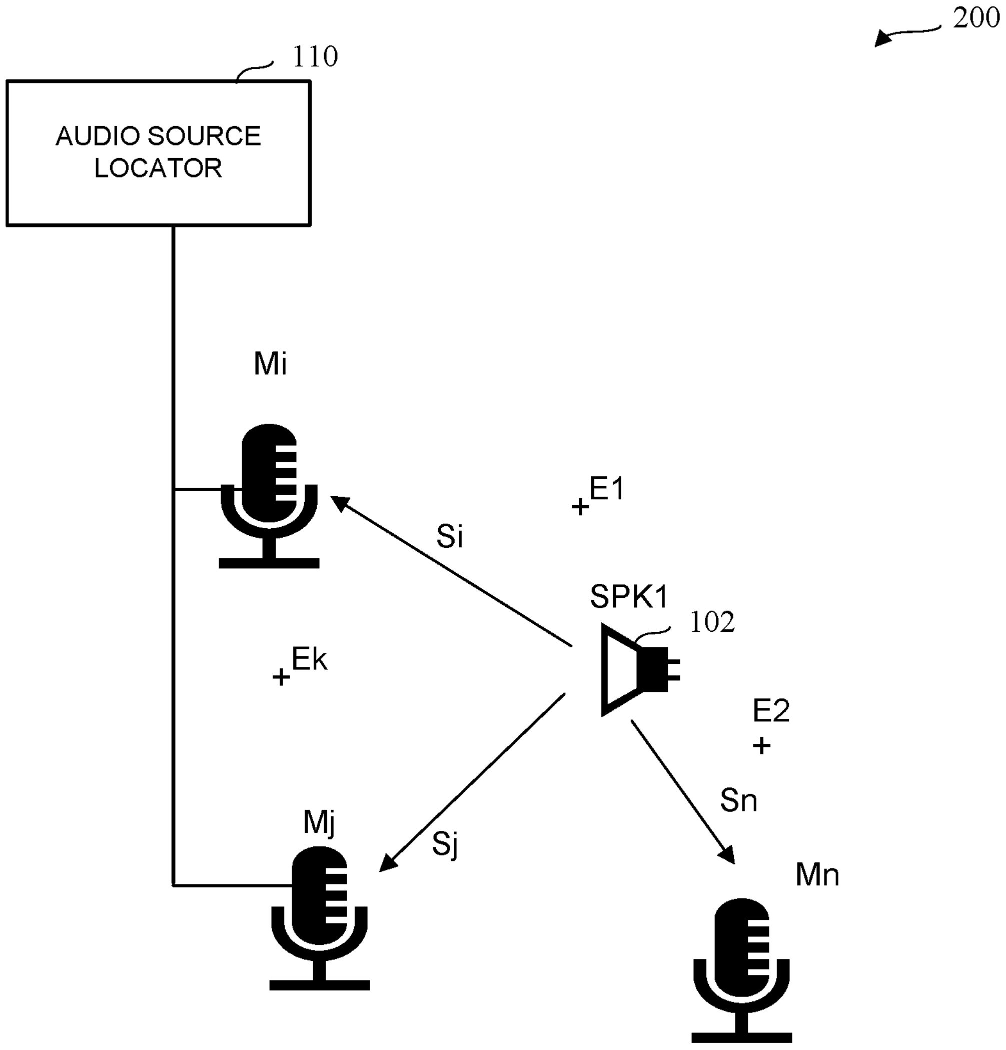
FIG. 2 is an illustration of the audio source location system of FIG. 1 showing source signals, Si, Sj, and Sn arriving at the microphones Mi, M, and Mn, respectively. Estimated source locations E1, E2 . . . Ek are also depicted in FIG. 2. The estimated source locations are shown only for illustrative purposes and do not represent any estimated source locations generated using the systems and apparatus disclosed herein.

FIG. 2 illustrates a configuration 200 of the audio source location system 100 of FIG. 1. In the configuration 200 of the audio location system 100, audio signals (Si, Sj . . . Sn) are transmitted by the example audio source 102 and captured at the example microphones Mi, Mj . . . Mn. In addition, an example number (k) estimated source locations E1, E2 . . . Ek of the audio source SPK1 are illustrated. Methods, apparatus, systems, and articles of manufacture disclosed herein calculate the estimated locations E1, E2 . . . Ek based, at least in part, on differences of arrival times (also referred to as time difference of arrival (TDOA) data) of the audio signals (Si, Sj . . . Sn) at different microphones (e.g., Mi, Mj . . . Mn).

Figure 3:
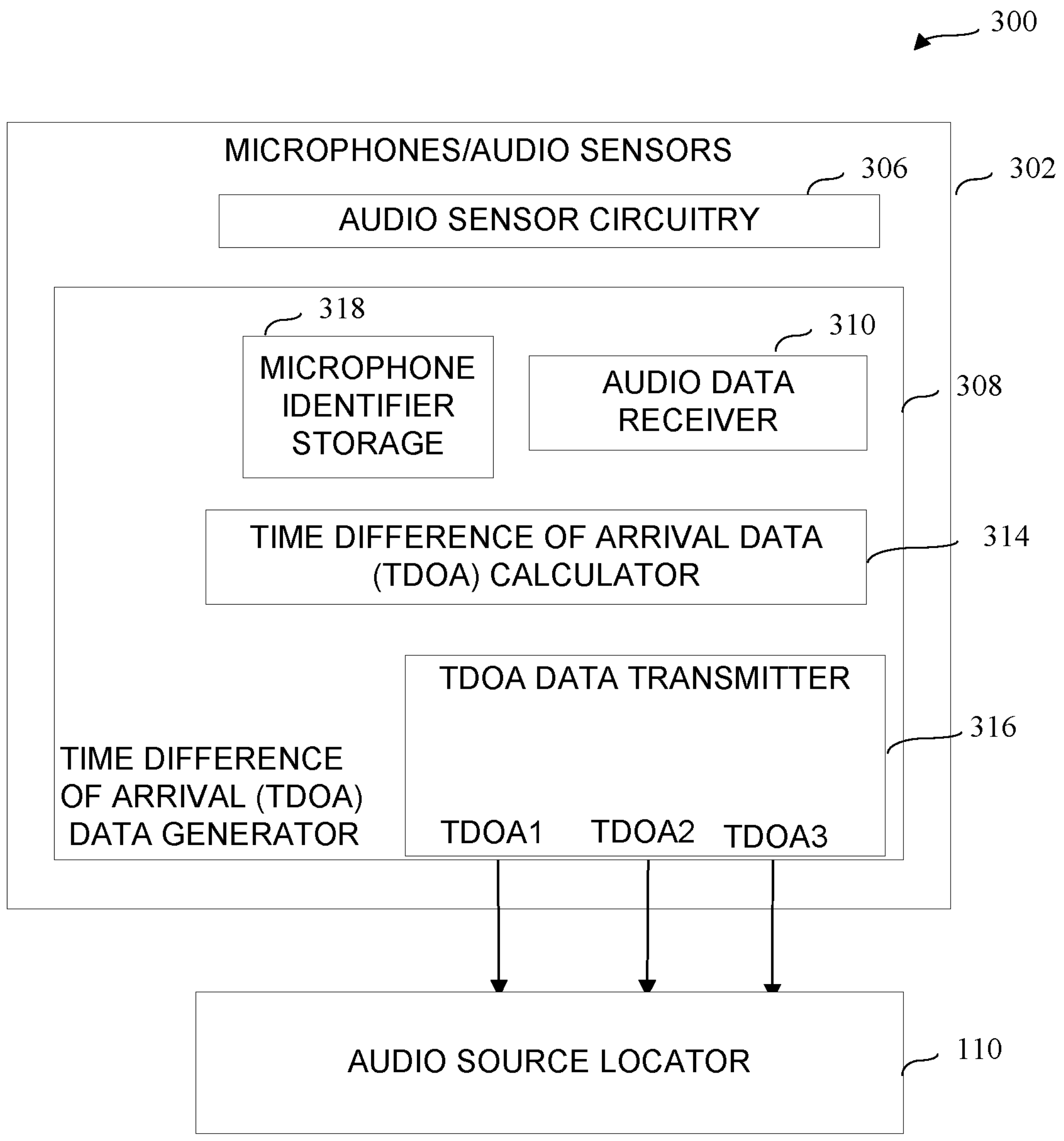
FIG. 3 is a block diagram of the audio source location system 100 of FIG. 1 including a microphone/audio sensor and an audio source locator.

FIG. 3 is a block diagram 300 of the audio source location system 100 of claim FIG. 1 and includes example microphones/audio sensors 302 (represented using the block 302), having example audio sensor circuitry 306, and an example time of arrival data generator 308 in communication (wirelessly or wired) with an example audio source locator 110 of the audio source location illustrated in FIG. 1 and FIG. 2. The microphones/audio sensors 302 of FIG. 3 are represented in FIG. 1 and FIG. 2 as the microphones Mi, Mj, . . . Mn. In some examples, the TDOA data generator 308 does not reside within the microphones but is instead located anywhere within the audio location system 100 (see FIG. 1) provided that the TDOA data generator 308 receives captured signal information from the microphones 302 (e.g., Mi, Mj . . . Mn).

Sensed audio information is supplied by the audio sensor circuity 306 to an example audio data receiver 310 of the example TDOA data generator 308. The sensed audio data is supplied by the audio data receiver 310 to an example TDOA data calculator 314 which generates TDOA data. The TDOA data (e.g., TDOA1, TDOA2, TDOA3) only three of which are shown in FIG. 3 are/is supplied to the example TDOA data transmitter 316 which, turn, supplies the TDOA data (e.g., TDOA1, TDOA2, TDOA3) to the example audio source locator 110.

The TDOA data represents a time difference between of arrival (TDOA) of an audio signal (e.g., S1) at different ones of the microphones (e.g., Mi, Mj . . . Mn). In some examples, the TDOA data values are represented as a time at which a first signal Si (FIG. 2) is captured at the microphone Mi and time as which a second audio signal Sj (FIG. 2)) is captured at the microphone Mj (e.g., TGCC_i_j=tS_Mi−tS_Mj, where TGCC_i_j is the TDOA data between microphone Mi and microphone Mj). In some examples, the TDOA data calculator 314 uses an algorithm such as a generalized cross correlation with phase transform (GccPhat) algorithm to generate the TDOA (TGCC_i_j=tS_Mi−tS_Mj) value for the audio signals (Si, Sj) received at the microphones mi, mj. Similarly, TCGG values are calculated between any of the microphones (Mi, Mj, Mn).

The example time difference of arrival (TDOA) data transmitter 316 transmits the TDOA (e.g., the TGCC values) data with information identifying the corresponding microphones for which the TDOA data was generated. In some examples, information identifying the corresponding microphones (e.g., Mi and Mj) for which a corresponding TDOA data value is calculated is stored in an example microphone identifier storage 318 and accessed by the TDOA data calculator 314 and/or the TDOA data transmitter 316 for transmittal with the corresponding TDOA data (e.g., TDOA1, TDOA2, TDOA3). In some examples, the microphone identifier storage 318 can also store information identifying locations at which corresponding ones of the microphones (e.g., Mi, Mj . . . Mn) are located.

In some examples, the example audio source locator 110 uses the TDOA data to calculate estimated source locations and to select one (or more) of the calculated estimated source location to represent a location(s) at which the example source SPK1 (FIG. 1, and FIG. 2) is located or to represent multiple estimated source locations at which the audio source SPK1 (of FIG. 1 and FIG. 2) is likely to be located.

Figure 4:
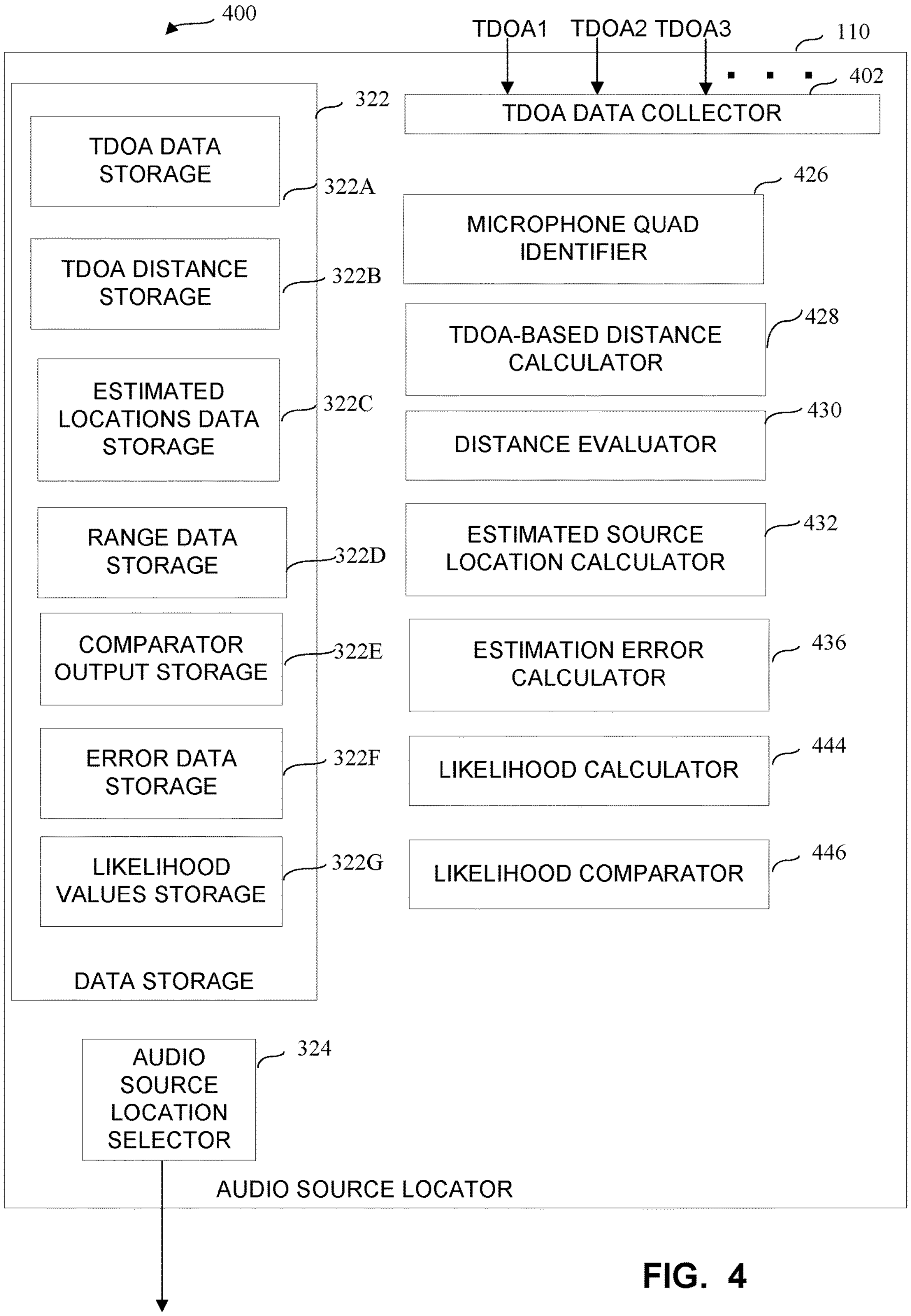
FIG. 4 is a block diagram of the audio source locator of FIG. 3.

FIG. 4 is a block diagram of the example audio source locator 110 of FIG. 3. As illustrated in FIG. 3, the audio source locator 110 (also shown in FIGS. 1, 2, and 3) includes an example TDOA data collector 402, an example an example microphone quad identifier 426, an example TDOA-based distance calculator 428, an example distance evaluator 430, an example estimated source location calculator 432, an example estimation error calculator 444, and an example likelihood calculator 446. In some examples, the TDOA data TDOA1, TDOA2, TDOA3, (including the microphone identifying information) is supplied to inputs of the TDOA data collector 402 from the TDOA data generator 308 (see FIG. 3). The TDOA data collector 402 causes the TDOA data to be stored in the TDOA data storage 322A of the example data storage 322.

In some examples, the example microphone quad identifier 426 uses the microphone identifiers to identify multiple microphones quads, each quad including 4 microphones. In some examples, the total number of microphones used is 5 or more. Each microphone quad includes different permutations of the five (or more) microphones. In some such examples, the microphone quad identifier 426 can remove data associated with any of the microphone quads when such data will render outputs that are redundant with respect to the outputs rendered in connection with others of the microphone quads. Additionally, some permutations of the microphones in a quad may not be capable of generating data in which case such quads will not be used and can be discarded (e.g., not stored or removed from storage). Example quads of a system including five microphones include at least (M1, M2, M3, M4), (M1, M3, M4, M5), (M3, M1, M2, M4), etc.

In some examples, a microphone of each microphone quad is selected to represent an origin microphone that is assumed to be located at the at the actual location of the audio source (e.g., at an x, y, z coordinate location of (0, 0, 0)). In some examples, for each quad, the origin microphone is paired with each of the other microphones in the quad to thereby obtain three microphone pairs. In an example microphone quad that includes a first microphone, (e.g., a microphone M1), a second microphone (e.g., a microphone M2), a third microphone, (e.g., a microphone M3), and a fourth microphone, (e.g, microphone M4), the first microphone M1 can be selected to be the origin microphone. In such examples, the designators M1, M2, M3 and M4 are assigned to differentiate microphones of the audio source location system 100. That is, the designators M1, M2, M3 and M4 are used as stand-ins designators for the microphones designated Mi, Mj . . . Mn) In some such examples, the quad can include a first microphone pair (M1, M2), a second microphone pair (M1, M3), and a third microphone pair (M1, M4).

For each quad, two example estimated source locations are determined. In some examples, the multiple (k) estimated source locations where the number (k) of estimated source locations can be represented by the set k∈(2, K), where $$\left(K_{MAX} = 2\binom{n}{4}\cdot 4!\right)$$

and the value "n" represents the number of microphones in the example audio source location system 100. The estimated source locations can be stored in the estimated locations data storage 322C.

Referring still to FIG. 4, in some examples, the example TDOA-based distance calculator 428 calculates a distance between microphones of each microphone pair. In some examples, the TDOA-based distance is calculated using the TDOA data collected for each microphone pair multiplied by the speed of sound. In some such examples, the speed of sound is adjusted to compensate for the environment in which the audio source location system 100 is positioned (e.g., air v. water). In some such examples, the TDOA data can be represented as "$TGCC_{\_i\_j}$=ts_Mj−ts_Mi" for a microphone pair (Mi, Mj) and the speed of sound is represented as "Vs." Thus, a calculated distance based on the TDOA data is represented as "DGcc_i_j" where "DGcc_i_j=(TGcc_i_j)*Vs)".

In some examples, the example distance evaluator 430 checks to determine whether the calculated distance values "DGCC" fall within an acceptable range (e.g., "$D_{Gcc\_i\_j} \in \langle -D_{Mi\_Mj}, D_{Mi\_Mj} \rangle$," where the range is inclusive of the boundaries. The distance evaluator 430 changes any calculated distance values higher than the higher boundary to match the higher value and changes any calculated distances lower than the lower boundary to match the lower boundary.

Estimated source location calculator 430 calculates the example estimated source locations using any of a number of audio source location techniques including those identified in the paper titled, *Passive Source Localization Employing Intersecting Spherical Surfaces from Time-of-Arrival Difference*, published in the IEEE Transactions on Acoustics, Speech, and Signal Processing, Vol. ASSP-35, No. 8, August 1987, and authored by H. C. Schau and A. Z. Robinson. In some examples, such techniques use known locations of the microphones (e.g., Mi, Mj, . . . Mn) and the corresponding TDOA data supplied by the example time difference of arrival (TDOA) data generator 308 (FIG. 3) to calculate the estimated source locations. The k estimated source locations (E1 . . . Ek) represent candidate source locations at which the audio source may be located. The k estimated source locations and the locations of the microphones (e.g., Mi, Mj, . . . Mn) as well as the location of the actual source can all be represented with three coordinates in a three dimensional space.

Referring still to FIG. 4, the example estimation error calculator 436 calculates an estimation error for each estimated source location. In some examples, the estimation errors are calculated using an example estimation error equation "Rk", where "Rk_i_j=D−Gcci_j−(DEk_Mj−DEk_Mi). The calculated estimation error Rk represents an amount of error between each estimated source location and an actual location of the source. As the actual location of the source is unknown, first proxy information that corresponds to the actual location can be used to calculate the estimation error of an estimated source location.

In some examples, the first proxy information is equal to the DGcc calculated distance determined by the example TDOA-based distance calculator 428. As described above, the TDOA data can be represented as "TGCC_i_j=tS_Mj−tS_Mi" for a microphone pair (Mi, Mj) and the adjusted speed of sound is represented as "Vs." Thus, a calculated distance based on the TDOA data is represented as "DGcc_i_j" where "DGcc_i_j=(TGcc_i_j)*Vs)".

The calculated distance "DGcc" represents a first distance (extending from the audio source to the first microphone M1 of a microphone pair) subtracted from a second distance (extending from the audio source to the second microphone of the same microphone pair). As DGcc cannot be directly measured it is instead deduced using the example TDOA based data. To provide further understanding, FIG. 5A illustrates a three dimensional audio source and microphone system reduced to a two dimensional 2D environment (referred to as the 2D system). The 2D system includes a source S (e.g., a speaker) located at the center of two concentric circles C1 and C2. The circles C1 and C2 are included only to assist in visualizing the DGcc value. The 2D system also includes a microphone pair (Mi and Mj). The circles C1 and C2 assist in understanding that the same audio signal reaches the microphone Mi and Mj at difference times based on the distance between each microphone and source. As the TDOA data "$TGCC_{\_i\_j}$=ts_Mj−ts_Mi" represents a time difference between 1) a first amount of time it took for an audio signal to reach the microphone Mj from the audio source, and 2) a second amount of time it took for the same audio signal to reach the microphone Mi from the audio source (SPK1) then multiplying that time difference by the speed of sound results in the first proxy "DGcc" information that represents the difference between the distances from the audio source (e.g., the speaker S) to each of the microphones Mi and Mj without having to know the actual location of the audio source.

Second proxy information is based on the locations of the microphone Mi and the microphone Mj and on the estimated source location (determined by the example estimated source location calculator 432 (FIG. 4)). The second proxy information is equal to the difference between the distances from an estimated source location (e.g., Ek) to each of the microphones Mi and Mj. Thus, the second proxy information is equal to the difference between the distance D(Ek−Mi) and the distance D(Ek−Mj). FIG. 5B illustrates a three dimensional audio source and microphone system reduced to a two dimensional 2D environment (referred to as the 2D system). The 2D system includes a source S (e.g., a speaker), a microphone pair (Mi and Mj) and an estimated source location Ek. In the illustrated 2D system of FIG. 5, the distance between the estimated source location Ek and the microphone Mi (DEk_M1) is illustrated as well as the distance between the estimated source location Ek and the microphone Mj (DEk_Mj). The distance DMi_Mj represents the distance between the two microphones.

When calculating estimation errors associated with the estimated source locations, the estimation error calculator 436 calculates individual errors for each of the microphone pairs used to generate a corresponding estimated source location. For example, consider a first quad (generated for a system having five microphones—M1, M2, M3, M4, M5) that includes the microphones (M1, M2, M3, M4) and for which the origin microphone is M1, In such an example, the microphone pairs for the quad include (M1, M2), (M1, M3), (M3, M4) and the estimation error associated with an estimated source location derived using the example quad includes individual errors including an error for the microphone pair M1, M2, an error for the microphone pair M1, M3, and an error for the microphone pair M1, M4. In addition, any of the system microphones not included in the quad (in this example, M5) contribute to the estimation error. In particular, the individual errors associated with the estimated source location and the microphone pairs (M1, M5) (M2, M5), (M3, M5) and (M4, M5) are also calculated for an estimated source location derived using the example quad. Thus, multiple estimation errors are calculated for each estimated source location. Calculating the estimation errors based on microphone(s) not included in the quad from which an estimated source location has been derived (e.g., (M1, M5) (M2, M5), (M3, M5) and (M4, M5) when determining the estimation errors for the estimated source location results in estimation errors that are more precise that they otherwise would be. In some examples, the example estimation errors are stored in the example error data storage 322F.

Next, the example likelihood calculator 444 determines a likelihood value Lk for each estimated source location by using a likelihood function that will return a value close to or equal to a value (e.g., "1") when the first proxy information and second proxy information are near in value (e.g., the estimated source location is near to the actual source location). In contrast, when the first proxy information and second proxy information are not close in value (e.g., the estimated source location is not near the actual source location) the likelihood function will return a value closer to or equal to 0 for the likelihood value Lk. In some examples, the example likelihood calculator determines the likelihood values using a likelihood function such as, $L\_k=1-(1/Z)*\Sigma\_(i,j)[(R\_(k\_i\_j)/(2D\_(Mi\_Mj)))]\hat{}2$, where Z is the number of microphone pairs for which an estimation error was determined for a given estimated source location. Thus, Z provides a normalizing operation.

In some examples, the example likelihood values are stored in the example likelihood value storage 322H and the example audio source location selector 324 selects the estimated source location associated with the largest likelihood value as being the most likely one of the estimated source location to nearest to or at the actual physical location of the audio source 102 (FIG. 1 and FIG. 2). In some examples, depending on an application to which the estimated source locations will be used, more than a single estimated source location can be included (e.g., the estimated source location associated with the five highest likelihood values).

In some examples, the audio source location system includes means for identifying a microphone quad. For example, the means for identifying a microphone quad may be implemented by the example microphone quad identifier 426 of FIG. 4. In some examples, the microphone quad identifier 426 may be implemented by machine executable instructions such as that implemented by at least blocks 606 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the microphone quad identifier 426 is implemented by other hardware logic circuitry, hardware implemented state machines, and/or any other combination of hardware, software, and/or firmware. For example, the microphone quad identifier 426 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the audio source location system 100 includes means for calculating time difference of arrival data. For example, the means for calculating time difference of arrival data may be implemented by the example time difference of arrival data calculator 314 of FIG. 3. In some examples, the time difference of arrival data calculator 314 of FIG. 3 may be implemented by machine executable instructions such as that implemented by at least blocks 604 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the time difference of arrival data calculator 314 of FIG. 3 is implemented by other hardware logic circuitry, hardware implemented state machines, and/or any other combination of hardware, software, and/or firmware. For example, the time difference of arrival data calculator 314 of FIG. 3 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the audio source location system 100 apparatus includes means for evaluating a distance. For example, the means for evaluating a distance may be implemented by the example distance evaluator 430 of FIG. 4 and/or may be implemented as part of the example estimated source location calculator 432 of FIG. 4. In some examples, the example distance evaluator 430 of FIG. 4 may be implemented by machine executable instructions such as that implemented by at least blocks 608 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the example distance evaluator 430 of FIG. 4 is implemented by other hardware logic circuitry, hardware implemented state machines, and/or any other combination of hardware, software, and/or firmware. For example, the example distance evaluator 430 of FIG. 4 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the audio source location system 100 includes means for calculating an estimated source location. For example, the means for calculating the estimated source location may be implemented by the example estimated source location calculator 432 of FIG. 4. In some examples, the estimated source location calculator 432 may be implemented by machine executable instructions such as that implemented by at least blocks 608 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the estimated source location calculator 432 is implemented by other hardware logic circuitry, hardware implemented state machines, and/or any other combination of hardware, software, and/or firmware. For example, the estimated source location calculator 432 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the audio source location system 100 includes means for calculating estimation errors. For example, the means for calculating estimation errors may be implemented by the example estimation error calculator 436 of FIG. 4. In some examples, the example estimation error calculator 436 may be implemented by machine executable instructions such as that implemented by at least blocks 614 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the example estimation error calculator 436 is implemented by other hardware logic circuitry, hardware implemented state machines, and/or any other combination of hardware, software, and/or firmware. For example, the example estimation error calculator 436 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the audio source location system 100 includes means for calculating a likelihood. For example, the means for calculating a likelihood be implemented by the example likelihood calculator 444 of FIG. 4. In some examples, the example likelihood calculator 444 may be implemented by machine executable instructions such as that implemented by at least blocks 616 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the example likelihood calculator 444 is implemented by other hardware logic circuitry, hardware implemented state machines, and/or any other combination of hardware, software, and/or firmware. For example, the example likelihood calculator 444 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the audio source location system 100 includes means for comparing likelihood values and/or selecting a likelihood value. For example, the comparing likelihood values and/or selecting a likelihood value may be implemented by the example likelihood comparator calculator 446 of FIG. 4 and/or the example audio source location selector 324 of FIG. 4. In some examples, the example likelihood comparator calculator 446 of FIG. 4 and/or the example audio source location selector 324 may be implemented by machine executable instructions such as that implemented by at least blocks 618 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the likelihood comparator calculator 446 of FIG. 4 and/or the example audio source location selector 324 is implemented by other hardware logic circuitry, hardware implemented state machines, and/or any other combination of hardware, software, and/or firmware. For example, the example likelihood comparator calculator 446 of FIG. 4 and/or the example audio source location selector 324 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the audio source locator 110 of FIG. 4 is illustrated in FIG. 4, one or more of the elements, processes, and/or devices illustrated in FIG. 4 may be combined, divided, re-arranged, omitted, eliminated, and/or implemented in any other way. Further, the example microphone/audio sensors 302, the example audio sensor circuitry 306, the example audio data receiver 310, the example time difference of arrival (TDOA) data calculator 314, the example data transmitter 316, the example microphone identifier storage 318, the example data storage 322, and the data storages associated therewith 322A-322H, the example data collector 402, the example microphone pair and quad identifier 426, the example TDOA-based distance calculator 428, the example distance evaluator 430, the example estimated source location calculator 432, the example estimation error calculator 436, the example likelihood calculator 444, the example likelihood comparator 446 and/or, more generally, the example audio source locator 110/and/or the example microphones/audio sensors of FIG. 3, and FIG. 4 may be implemented by hardware, software, firmware, and/or any combination of hardware, software, and/or firmware. Thus, for example, any of the example microphone/audio sensors 302, the example audio sensor circuitry 306, the example audio data receiver 310, the example time difference of arrival (TDOA) data calculator 314, the example data transmitter 316, the example microphone identifier storage 318, the example data storage 322, and the data storages associated therewith 322A-322G, the example data collector 402, the example microphone pair and quad identifier 426, the example TDOA-based distance calculator 428, the example distance evaluator 430, the example estimated source location calculator 432, the example estimation error calculator 436, the example likelihood calculator 444, the example likelihood comparator 446 and/or, more generally, the example audio source locator 110/and/or the example microphones/audio sensors, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example microphone/audio sensors 302, the example audio sensor circuitry 306, the example audio data receiver 310, the example time difference of arrival (TDOA) data calculator 314, the example data transmitter 316, the example microphone identifier storage 318, the example data storage 322, and the data storages associated therewith 322A-322G, the example data collector 402, the example microphone pair and quad identifier 426, the example TDOA-based distance calculator 428, the example distance evaluator 430, the example estimated source location calculator 432, the example estimation error calculator 436, the example likelihood calculator 444, the example likelihood comparator 446 and/or, more generally, the example audio source locator 110/and/or the example microphones/audio sensors is/are hereby expressly defined to include a non-transitory computer readable storage device or storage disk such as a memory, a digital versatile disk (DVD), a compact disk (CD), a Blu-ray disk, etc., including the software and/or firmware. Further still, the example audio source location system 100, 200 of FIG. 1 and FIG. 2 may include one or more elements, processes, and/or devices in addition to, or instead of, those illustrated in FIG. 3 and FIG. 4, and/or may include more than one of any or all of the illustrated elements, processes and devices.

Figure 6:
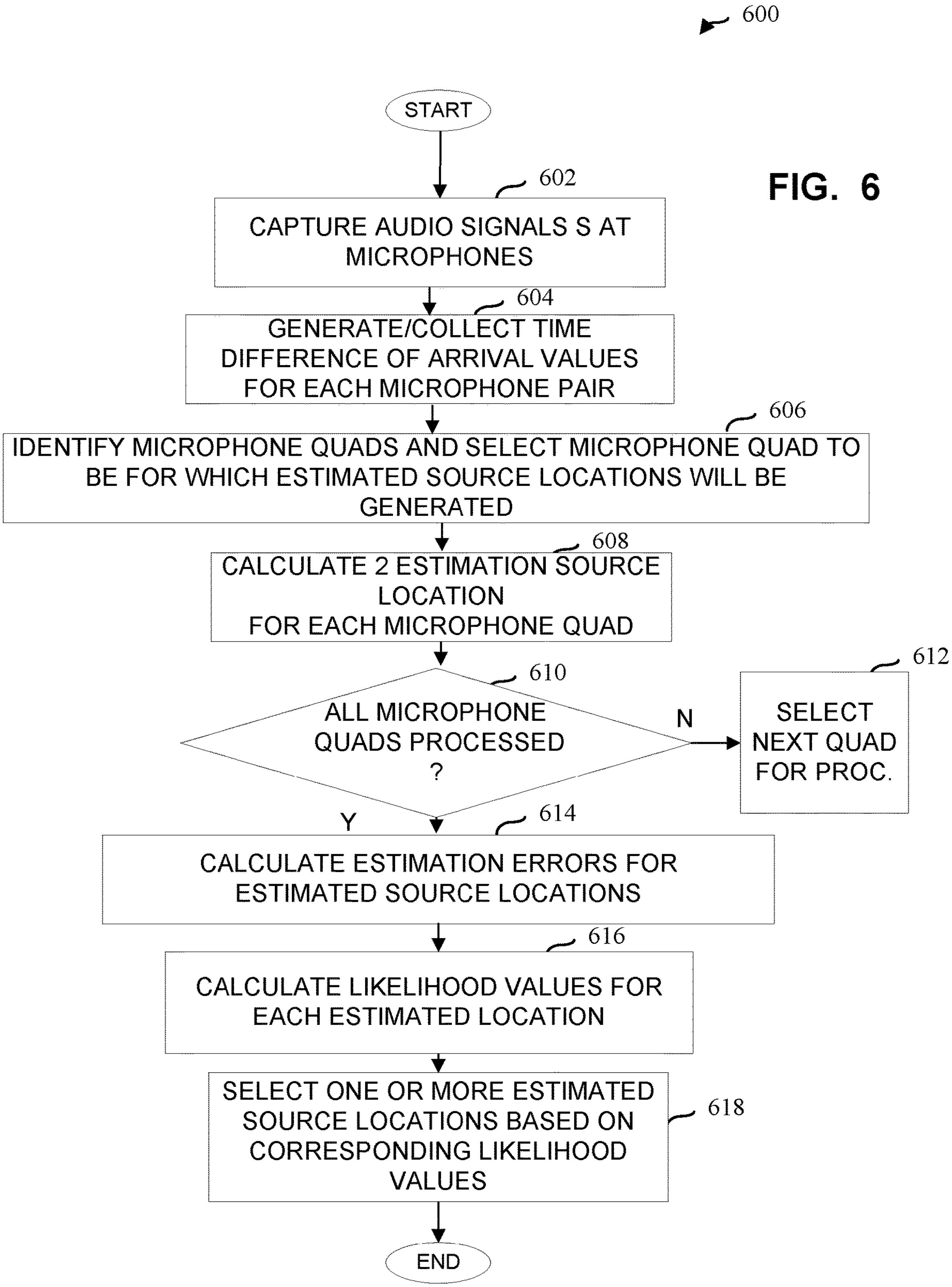
FIG. 6 is a flowchart representative of example machine readable instructions that may be executed by example processor circuitry to implement all or portions of the audio source location system of FIG. 1, FIG. 2, FIG. 3 and FIG. 4.

A flowchart representative of example hardware logic circuitry, machine readable instructions, hardware implemented state machines, and/or any combination thereof for implementing the audio source location system 100, 200, 300, and 400 of FIGS. 1, 2, 3, and 4 is shown in FIG. 6. The machine readable instructions may be one or more executable programs or portion(s) of an executable program for execution by processor circuitry, such as the processor circuitry 712 shown in the example processor platform 700 discussed below in connection with FIG. 4 and/or the example processor circuitry discussed below in connection with FIGS. 8 and/or 9. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 7, many other methods of implementing the example audio source location system 100 of FIG. 1, FIG. 2, and FIG. 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions and/or example operations 600 that may be executed and/or instantiated by processor circuitry to estimate a location of an audio source using microphones/audio sensors. The machine readable instructions and/or operations 600 of FIG. 6 begin at block 602, at which the example microphones/audio sensors capture audio signals emitted by the audio source. At a block 604, the example time difference of arrival data calculator 314 (FIG. 3) calculates time difference of arrival data for captured audio signals captured at each microphone in each set of microphone pairs. In some examples, at a block 606, the example microphone quad identifier 426 identifies a set of microphone quads in the manner described above with respect to FIG. 4.

Also, at a block 608, the estimated source location calculator of FIG. 3 calculates two estimated locations of the audio source for each microphone quad as described above with respect to FIG. 4. Unless all microphone quads have been processed (as determined at a block 610), the audio source location system proceeds to select a next microphone quad (at a block 612) for processing at the blocks 602-612. The blocks 602-610 are repeated until all of the microphone pairs and quad have been processed thereat.

Next, at a block 614, the example estimation error calculator 436 generates multiple estimation errors for each estimated source location as described above with respect to FIG. 4. In some examples, for each estimated source location, an estimation error is generated for all possible microphone pairs of the system.

At a block 616, the example likelihood value calculator 444 (FIG. 4) determines a likelihood value for each estimated source location as described above with respect to FIG. 4. Finally, at a block 618, the example likelihood comparator 448 compares all of the likelihood values to each other to determine which of the likelihood values is the closest to 1 (or any desired threshold as dictated by the likelihood algorithm or equation used to generate the likelihood values. The audio example source selector location selector 324 then selects/identifies the estimated source location(s) associated with the likelihood value that is closest to 1 (or to any other desired value or as compared to any desired threshold). In some examples there can be multiple estimated locations having the same likelihood value. In some such examples, all such estimation source locations may be returned by the program/method of the flowchart 600 (FIG. 6). The selected estimated source location can then be used in any application to represent the most likely physical location of the audio source 102. The example flowchart 600 of FIG. 6 ends.

Figure 7:
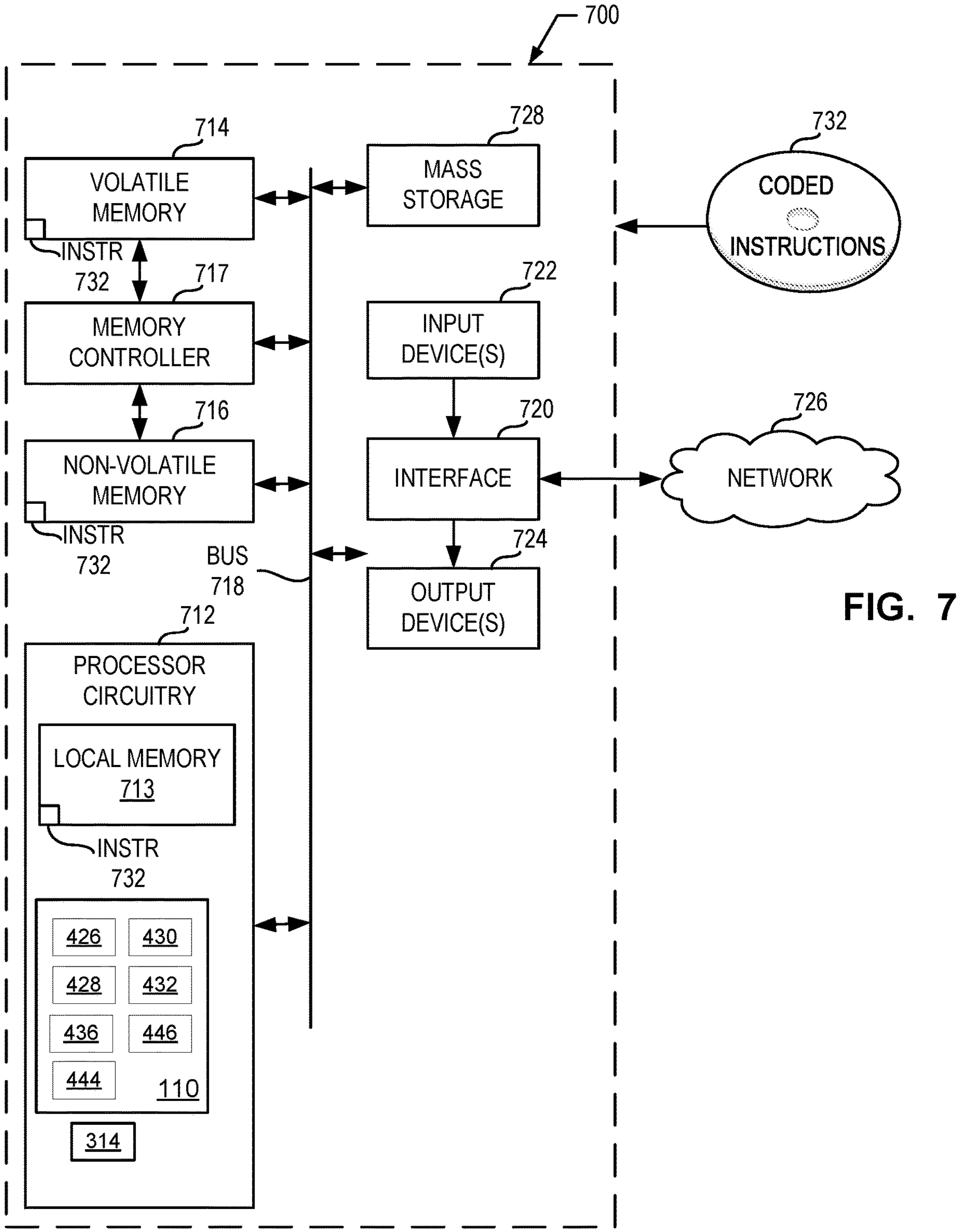
FIG. 7 is a block diagram of an example processing platform including processor circuitry structured to execute the example machine readable instructions of FIG. 6 to implement the audio source location system of FIGS. 1, 2, 3 and 4.

FIG. 7 is a block diagram of an example processor platform 700 structured to execute and/or instantiate the machine readable instructions and/or operations of FIG. 6 to implement the audio source location system of FIGS. 1, 2, 3, and 4. The processor platform 700 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the example time difference of arrival (TDOA) data calculator 314, the example data collector 402, the example microphone pair and quad identifier 426, the example TDOA-based distance calculator 428, the example distance evaluator 430, the example estimated source location calculator 432, the example estimation error calculator 436, the example likelihood calculator 444, the example likelihood comparator 446 and/or, more generally, the example audio source locator 110.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717. In some examples, the example microphone identifier storage 318, the example data storage 322, and the data storages associated therewith 322A-322G can all be implemented by one or more of the above-identified memory devices.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor(s) (including any and/or all of the microphones/audio sensors of the FIGS. 1, 2, 3, 5A, and 5B), a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output devices 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 732, which may be implemented by the machine readable instructions of FIG. 6 may be stored in the mass storage device 728, in the volatile memory 714, in the non-volatile memory 716, and/or on a removable non-transitory computer readable storage medium such as a CD or DVD.

Figure 8:
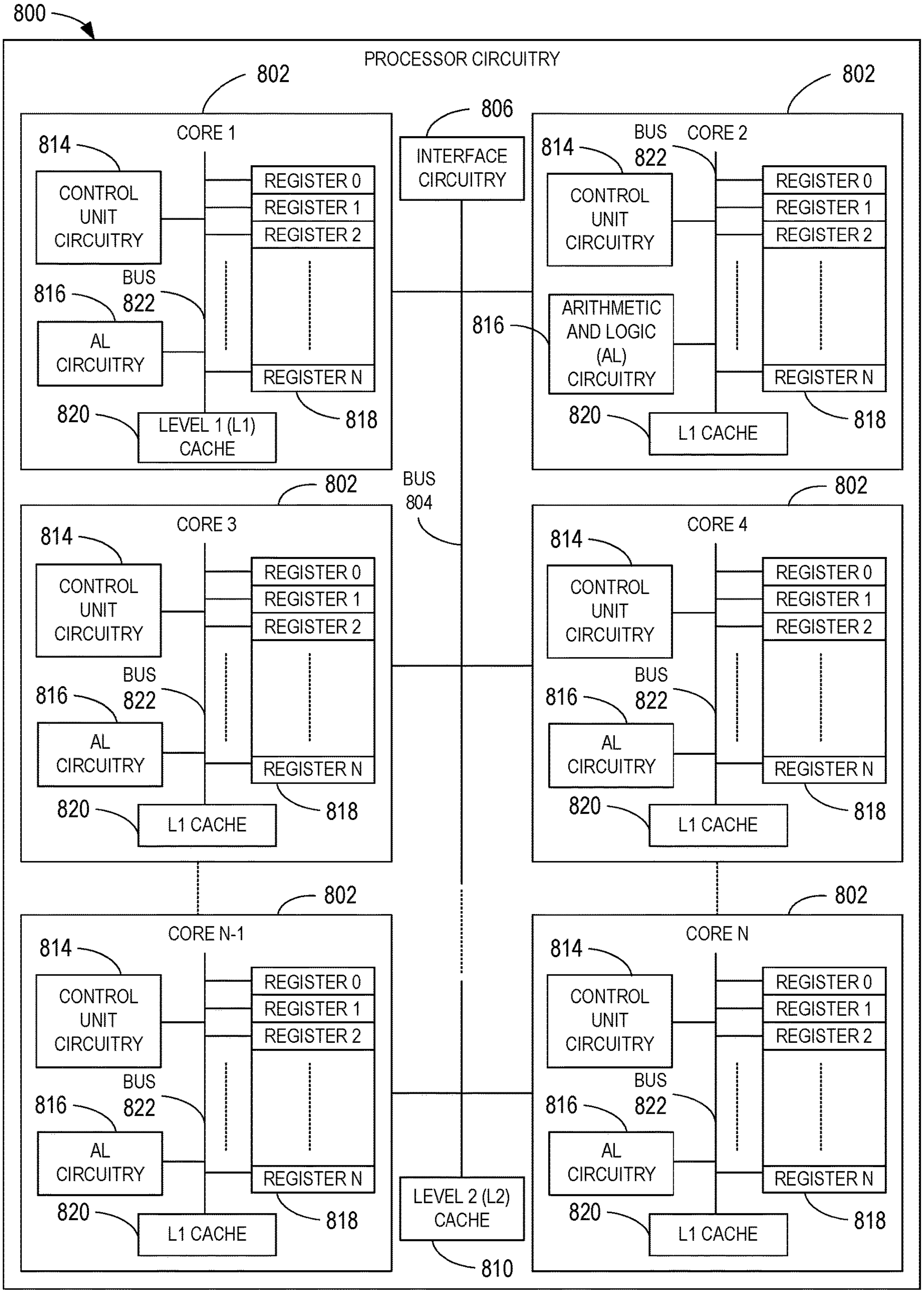
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a microprocessor 800. For example, the microprocessor 800 may implement multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowchart of FIG. 6.

The cores 802 may communicate by an example bus 804. In some examples, the bus 804 may implement a communication bus to effectuate communication associated with one(s) of the cores 802. For example, the bus 804 may implement at least one of an Inter-Integrated Circuit (I2C) bus, a Serial Peripheral Interface (SPI) bus, a PCI bus, or a PCIe bus. Additionally, or alternatively, the bus 804 may implement any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2_cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the L1 cache 820, and an example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register (s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The bus 820 may implement at least one of an I2C bus, a SPI bus, a PCI bus, or a PCIe bus.

Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
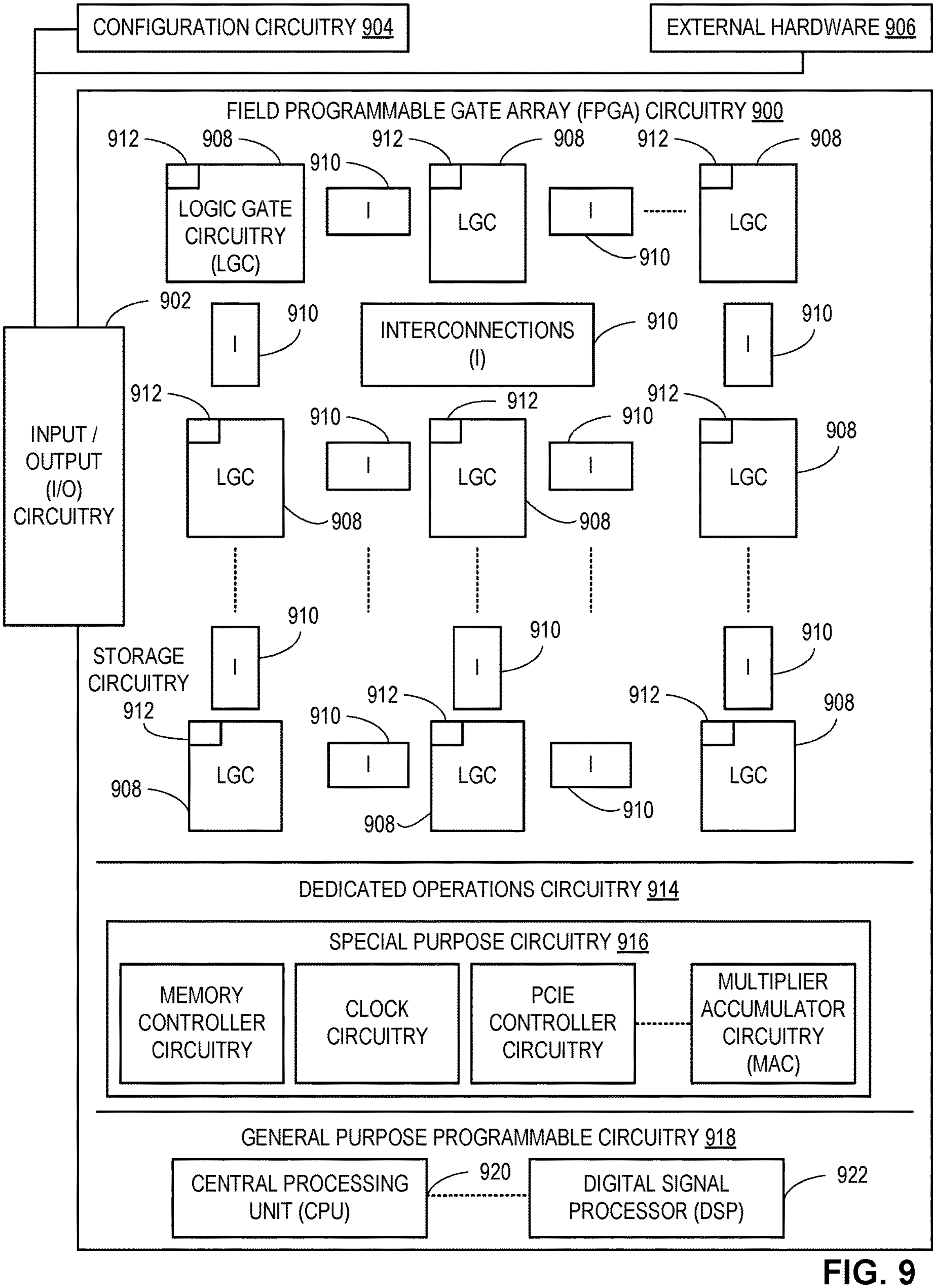
FIG. 9 is a block diagram of another example implementation of the processor circuitry of FIG. 7.

FIG. 9 is a block diagram of another example implementation of the processor circuitry 712 of FIG. 7. In this example, the processor circuitry 712 is implemented by FPGA circuitry 900. The FPGA circuitry 900 can be used, for example, to perform operations that could otherwise be performed by the example microprocessor 700 of FIG. 7 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 700 of FIG. 7 described above (which is a general purpose device that may be programmed to execute some or all of the machine readable instructions represented by the flowchart of FIG. 6 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowchart of FIG. 6 In particular, the FPGA 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowchart of FIG. 6 As such, the FPGA circuitry 900 may be structured to effectively instantiate some or all of the machine readable instructions of the flowchart of FIG. 6 as dedicated logic circuits to perform the operations corresponding to those software instructions in a dedicated manner analogous to an ASIC. Therefore, the FPGA circuitry 900 may perform the operations corresponding to the some or all of the machine readable instructions of FIG. 6 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware (e.g., external hardware circuitry) 906. For example, the configuration circuitry 904 may implement interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may implement the microprocessor 900 of FIG. 5. The FPGA circuitry 900 also includes an array of example logic gate circuitry 908, a plurality of example configurable interconnections 910, and example storage circuitry 912. The logic gate circuitry 908 and interconnections 910 are configurable to instantiate one or more operations that may correspond to at least some of the machine readable instructions of FIG. 6 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowchart of FIG. 6 may be executed by one or more of the cores 802 of FIG. 8 and a second portion of the machine readable instructions represented by the flowchart of FIG. 6 may be executed by the FPGA circuitry 900 of FIG. 9.

In some examples, the processor circuitry 712 of FIG. 7 may be in one or more packages. For example, the processor circuitry 800 of FIG. 8 and/or the FPGA circuitry 800 of FIG. 8 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed that determine a location of an audio source. The disclosed systems, methods, apparatus, and articles of manufacture improve the accuracy of determining a location of an audio source in an environment in which the location is otherwise unknown. The disclosed systems, methods, apparatus, and articles of manufacture makes use of information provided by multiple microphones, to select an estimate of the location of the audio source. Further, the disclosed systems, methods, apparatus, and articles of manufacture provide improved source location accuracy in dispersed microphone systems, and, as a result, can be used in more markets applications including, for example, 1) a smart city and/or an application in which a location of an explosion, a gun shot, or any other loud incident is to be determined, 2) an underwater applications for use in passive marine tracking, 3) an ecological application that includes locating animals based on their sounds (lion roar, singing of whale), as well as locating underwater events like volcano eruption, 4) indoor application for use in locating a speaker in a conference room, locating the source of loud noises such as glass breaking, a dog barking and/or a baby crying.

Example methods, apparatus, systems, and articles of manufacture to determine a location of an audio source are disclosed herein. Further examples and combinations thereof include the following:

Example 1 includes an apparatus to identify a physical location of an audio source, the apparatus comprising a microphone set identifier to identify ordered microphone sets from a plurality of microphones, an estimated source location calculator to calculate estimated source locations for the audio source, an estimation error calculator to calculate respective estimation errors for corresponding ones of the estimated source locations, a first one of the estimation errors for a first one of the estimated locations based on an individual error corresponding to a microphone pair included in a first ordered microphone set used to determine the first one of the estimated locations and at least one other individual error corresponding to a different microphone pair having a microphone not included in the first ordered microphone set, and a likelihood calculator to calculate respective likelihood values for corresponding ones of the estimated source locations, a first one of the estimated source location associated with a selected one of the likelihood values to be used to represent the physical location of the audio source.

Example 2 includes the apparatus of example 1, further including a likelihood comparator to compare the respective likelihood values corresponding to the estimated source locations, and an audio source location selector to select the first one of the estimated source locations to be used to represent the physical location of the audio source based on an output of the comparator.

Example 3 includes the apparatus of example 2, wherein the first one of the estimated source locations to be used to represent the physical location of the audio source has a highest likelihood value based on the comparison of the estimated source locations.

Example 4 includes the apparatus of example 1, wherein the estimation error calculator is to calculate a first one of the individual errors based on a difference between a first distance and a second distance, the first distance determined using time difference of arrival (TDOA) data and the second distance determined using microphone positional data.

Example 5 includes the apparatus of example 4, wherein the estimation error calculator is to calculate the first distance based on the TDOA data multiplied by the speed of sound adjusted for an environment in which the audio signal is generated, the TDOA data to represent a time difference of arrival between captured audio signal information at a first microphone associated with the first one of the individual errors and captured audio signal information at a second microphone associated with the first one of the individual errors.

Example 6 includes the apparatus of example 4, wherein the second distance is a difference between 1) the first one of the estimated source locations and a first position of a first microphone associated with the first one of the individual errors, and 2) the first one of the estimated source locations and a second position of a second microphone associated with the first one of the individual errors.

Example 7 includes the apparatus of example 4, wherein the number of microphones is greater than example 5 includes example 8 includes the apparatus of example 1, wherein the ones of the ordered microphone sets include different permutations of microphones, one of the microphones in each of the ordered sets of microphones being designated an origin microphone, and other ones of the microphones in each of the ordered sets being paired with the origin microphone to create microphone pairs.

Example 9 includes an apparatus to identify an estimated location of an audio source, the apparatus comprising interface circuitry to access an audio signal, and processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations or the third operations to instantiate a microphone set identifier to identify ordered microphone sets from a plurality of microphones an estimated location calculator to generate an estimated source location calculator to calculator estimated source locations for the audio source, an estimation error calculator to calculate respective estimation errors for corresponding ones of the estimated source locations, a first one of the estimation errors for a first one of the estimated locations based on an individual error corresponding to a microphone pair included in a first ordered microphone set used to determine the first one of the estimated locations and at least one other individual error corresponding to a different microphone pair having a microphone not included in the first ordered microphone set, and a likelihood calculator to calculate respective likelihood values for corresponding ones of the estimated source locations, a first one of the estimated source location associated with a selected one of the likelihood values to be used to represent the physical location of the audio source.

Example 10 includes the apparatus of example 9, further including a likelihood comparator to compare the respective likelihood values corresponding to the estimated source locations, and an audio source location selector to select the first one of the estimated source locations to be used to represent the physical location of the audio source based on an output of the comparator.

Example 11 includes the apparatus of example 9, wherein the first one of the estimated source locations to be used to represent the physical location of the audio source has a highest likelihood value based on the comparison of the estimated source locations.

Example 12 includes the apparatus of example 9, wherein the estimation error calculator is to calculate a first one of the individual errors based on a difference between a first distance and a second distance, the first distance determined using time difference of arrival (TDOA) data and the second distance determined using microphone positional data.

Example 13 includes the apparatus of example 12, wherein the estimation error calculator is to calculate the first distance based on the TDOA data multiplied by the speed of sound adjusted for an environment in which the audio signal is generated, the TDOA data to represent a time difference of arrival between captured audio signal information at a first microphone associated with the first one of the individual errors and captured audio signal information at a second microphone associated with the first one of the individual errors.

Example 14 includes the apparatus of example 12, wherein the second distance is a difference between 1) the first one of the estimated source locations and a first position of a first microphone associated with the first one of the individual errors, and 2) the first one of the estimated source locations and a second position of a second microphone associated with the first one of the individual errors.

Example 15 includes the apparatus of example 12, wherein the number of microphones is greater than example 5 includes example 16 includes the apparatus of example 9, wherein the ones of the ordered microphone sets include different permutations of microphones, one of the microphones in each of the ordered sets of microphones being designated an origin microphone, and other ones of the microphones in each of the ordered sets being paired with the origin microphone to create microphone pairs.

Example 17 includes an method of identify a physical location of an audio source, the method comprising identifying, by execution and instruction with at least one processor, a microphone set identifier to identify ordered microphone sets from a plurality of microphones, calculating, by execution and instruction with at least one processor, an estimated source location calculator for the audio source, calculating respective estimation errors for corresponding ones of the estimated source locations, a first one of the estimation errors for a first one of the estimated locations based on an individual error corresponding to a microphone pair included in a first ordered microphone set used to determine the first one of the estimated locations and at least one other individual error corresponding to a different microphone pair having a microphone not included in the first ordered microphone set, and calculating respective likelihood values for corresponding ones of the estimated source locations, a first one of the estimated source location associated with a selected one of the likelihood values to be used to represent the physical location of the audio source.

Example 18 includes the method of example 17, further including comparing the respective likelihood values corresponding to the estimated source locations, and selecting the first one of the estimated source locations to be used to represent the physical location of the audio source based on an output of the comparator.

Example 19 includes the method of example 17, wherein the first one of the estimated source locations to be used to represent the physical location of the audio source has a highest likelihood value based on the comparison of the estimated source locations.

Example 20 includes the method of example 17, wherein the estimation error calculator is to calculate a first one of the individual errors based on a difference between a first distance and a second distance, the first distance determined using time difference of arrival (TDOA) data and the second distance determined using microphone positional data.

Example 21 includes the method of example 20, wherein the first distance is calculated based on the TDOA data multiplied by the speed of sound adjusted for an environment in which the audio signal is generated, the TDOA data to represent a time difference of arrival between captured audio signal information at a first microphone associated with the first one of the individual errors and captured audio signal information at a second microphone associated with the first one of the individual errors.

Example 22 includes the method of example 20, wherein the second distance is calculated as a difference between 1) the first one of the estimated source locations and a first position of a first microphone associated with the first one of the individual errors, and 2) the first one of the estimated source locations and a second position of a second microphone associated with the first one of the individual errors.

Example 23 includes the method of example 20, wherein the number of microphones is greater than example 5 includes example 24 includes the method of example 20, wherein the ones of the ordered microphone sets include different permutations of microphones, one of the microphones in each of the ordered sets of microphones being designated an origin microphone, and other ones of the microphones in each of the ordered sets being paired with the origin microphone to create microphone pairs.

Example 25 includes At least one non transitory computer readable medium comprising computer readable instructions, that when executed, cause at least one processor to at least identify a microphone set identifier to identify ordered microphone sets from a plurality of microphones, calculate an estimated source location calculator for the audio source, calculate respective estimation errors for corresponding ones of the estimated source locations, a first one of the estimation errors for a first one of the estimated locations based on an individual error corresponding to a microphone pair included in a first ordered microphone set used to determine the first one of the estimated locations and at least one other individual error corresponding to a different microphone pair having a microphone not included in the first ordered microphone set, and calculate respective likelihood values for corresponding ones of the estimated source locations, a first one of the estimated source location associated with a selected one of the likelihood values to be used to represent the physical location of the audio source.

Example 26 includes the non-transitory computer readable medium of example 25, wherein the computer readable instructions further cause the at least one processor to compare the respective likelihood values corresponding to the estimated source locations, and select the first one of the estimated source locations to be used to represent the physical location of the audio source based on an output of the comparator.

Example 27 includes the non-transitory computer readable medium of example 26, the first one of the estimated source locations to be used to represent the physical location of the audio source has a highest likelihood value based on the comparison of the estimated source locations.

Example 28 includes the non-transitory computer readable medium of example 25, wherein the computer readable instructions further cause the at least one processor to calculate a first one of the individual errors based on a difference between a first distance and a second distance, the first distance determined using time difference of arrival (TDOA) data and the second distance determined using microphone positional data.

Example 29 includes the non-transitory computer readable medium of example 28, wherein first distance is calculated based on the TDOA data multiplied by the speed of sound adjusted for an environment in which the audio signal is generated, the TDOA data to represent a time difference of arrival between captured audio signal information at a first microphone associated with the first one of the individual errors and captured audio signal information at a second microphone associated with the first one of the individual errors.

Example 30 includes the non-transitory computer readable medium of example 28, wherein the second distance is calculated as a difference between 1) the first one of the estimated source locations and a first position of a first microphone associated with the first one of the individual errors, and 2) the first one of the estimated source locations and a second position of a second microphone associated with the first one of the individual errors.

Example 31 includes the non-transitory computer readable medium of example 28, wherein the number of microphones is greater than 5.

Example 32 includes the non-transitory computer readable medium of example 25, wherein the ones of the ordered microphone sets include different permutations of microphones, one of the microphones in each of the ordered sets of microphones being designated an origin microphone, and other ones of the microphones in each of the ordered sets being paired with the origin microphone to create microphone pairs.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to identify a physical location of an audio source, the apparatus comprising:

sensor circuitry to obtain audio signals from a plurality of microphones;

machine-readable instructions; and at least one processor circuit to be programmed based on the machine-readable instructions to:

identify ordered microphone sets from the plurality of microphones, ones of the ordered microphone sets to include different permutations of the microphones, one of the microphones in a first ordered microphone set of the ordered microphone sets to be designated an origin microphone of the first ordered microphone set, and other ones of the microphones in the first ordered microphone set to be paired with the origin microphone to form microphone pairs of the first ordered microphone set;

calculate estimated source locations for the audio source based on the audio signals obtained by the sensor circuitry, a first one of the estimated source locations based on the audio signals from a first microphone pair of the microphone pairs of the first ordered microphone set;

calculate respective estimation errors for corresponding ones of the estimated source locations, a first one of the estimation errors for the first one of the estimated source locations based on a first individual error corresponding to the first microphone pair and at least a second individual error corresponding to a different microphone pair having a microphone not included in the first ordered microphone set;

calculate respective likelihood values for corresponding ones of the estimated source locations;

determine the physical location of the audio source based on the estimated source locations and the respective likelihood values; and output the physical location of the audio source.

2. The apparatus of claim 1, wherein one or more of the at least one processor circuit is to:

compare the respective likelihood values corresponding to the estimated source locations; and select the first one of the estimated source locations to be used to represent the physical location of the audio source based on the comparison of the respective likelihood values.

3. The apparatus of claim 2, wherein the first one of the estimated source locations has a highest likelihood value among the respective likelihood values corresponding to the estimated source locations.

4. The apparatus of claim 1, wherein one or more of the at least one processor circuit is to calculate the first individual error based on a difference between a first distance and a second distance, the first distance determined based on time difference of arrival (TDOA) data and the second distance determined based on microphone positional data.

5. The apparatus of claim 4, wherein a number of the microphones is greater than 5.

6. An apparatus to identify a physical location of an audio source, the apparatus comprising:

interface circuitry to access audio signals from a plurality of microphones;

instructions; and at least one processor to be programmed based on the instructions to:

identify ordered microphone sets from the plurality of microphones;

determine estimated source locations for the audio source based on the audio signals accessed by the interface circuitry, a first one of the estimated locations based on the audio signals from a first microphone pair included in a first ordered microphone set of the ordered microphone sets;

calculate respective estimation errors for corresponding ones of the estimated source locations, a first one of the estimation errors for the first one of the estimated locations based on a first individual error corresponding to the first microphone pair and at least a second individual error corresponding to a different microphone pair having a microphone not included in the first ordered microphone set, the first individual error based on a difference between a first distance and a second distance, the first distance based on time difference of arrival (TDOA) data, and the second distance based on a difference between 1) a distance between the first one of the estimated source locations and a first position of a first microphone associated with the first individual error, and 2) a distance between the first one of the estimated source locations and a second position of a second microphone associated with the first individual error;

calculate respective likelihood values for corresponding ones of the estimated source locations;

determine the physical location of the audio source based on the estimated source locations and the respective likelihood values; and output the physical location of the audio source.

7. The apparatus of claim 6, wherein one or more of the at least one processor circuit is to:

compare the respective likelihood values corresponding to the estimated source locations; and select the first one of the estimated source locations to represent the physical location of the audio source based on the comparison of the respective likelihood values.

8. The apparatus of claim 6, wherein the first one of the estimated source locations has a highest likelihood value among the respective likelihood values corresponding to the estimated source locations.

9. The apparatus of claim 6, wherein a number of the microphones is greater than 5.

10. The apparatus of claim 6, wherein different ones of the ordered microphone sets include different permutations of microphones, one of the microphones in the first ordered microphone set of the ordered microphone sets to be designated an origin microphone, and other ones of the microphones in the first ordered set to be paired with the origin microphone to create microphone pairs of the first ordered microphone set.

11. A method to identify a physical location of an audio source, the method comprising:

identifying, by executing an instruction with at least one processor circuit, ordered microphone sets from a plurality of microphones;

calculating, with one or more of the at least one processor circuit, estimated source locations for the audio source based on audio signals obtained via sensor circuitry from the plurality of microphones, a first one of the estimated source locations based on the audio signals from a first microphone pair included in a first ordered microphone set of the ordered microphone sets;

calculating, with one or more of the at least one processor circuit, respective estimation errors for corresponding ones of the estimated source locations, a first one of the estimation errors for the first one of the estimated source locations based on a first individual error corresponding to the first microphone pair and at least a second individual error corresponding to a different microphone pair having a microphone not included in the first ordered microphone set, the first individual error based on a difference between a first distance and a second distance, the first distance based on time difference of arrival (TDOA) data, and the second distance based on a difference between 1) a distance between the first one of the estimated source locations and a first position of a first microphone associated with the first individual error, and 2) a distance between the first one of the estimated source locations and a second position of a second microphone associated with the first individual error; and calculating respective likelihood values for corresponding ones of the estimated source locations;

determining the physical location of the audio source based on the estimated source locations and the respective likelihood values; and outputting the physical location of the audio source.

12. The method of claim 11, including:

comparing the respective likelihood values corresponding to the estimated source locations; and selecting the first one of the estimated source locations to represent the physical location of the audio source based on the comparison of the respective likelihood values.

13. The method of claim 11, wherein the first one of the estimated source locations has a highest likelihood value among the respective likelihood values corresponding to the estimated source locations.

14. The method of claim 11, wherein a number of the microphones is greater than 5.

15. The method of claim 11, wherein different ones of the ordered microphone sets include different permutations of microphones, one of the microphones in the first ordered microphone set of the ordered microphone sets being designated an origin microphone, and other ones of the microphones in the first ordered set being paired with the origin microphone to create microphone pairs of the first ordered microphone set.

16. At least one non transitory computer readable medium comprising computer readable instructions cause at least one processor circuit to at least:

identify ordered microphone sets from a plurality of microphones, ones of the ordered microphone sets to include different permutations of the microphones, one of the microphones in a first ordered microphone set of the ordered microphone sets to be designated an origin microphone of the first ordered microphone set, and other ones of the microphones in the first ordered microphone set to be paired with the origin microphone to form microphone pairs of the first ordered microphone set;

calculate estimated source locations for an audio source based on audio signals obtained by sensor circuitry coupled to the plurality of microphones, a first one of the estimated source locations based on the audio signals from a first microphone pair of the microphone pairs of the first ordered microphone set;

calculate respective estimation errors for corresponding ones of the estimated source locations, a first one of the estimation errors for the first one of the estimated source locations based on a first individual error corresponding to the first microphone pair and at least a second individual error corresponding to a different microphone pair having a microphone not included in the first ordered microphone set;

calculate respective likelihood values for corresponding ones of the estimated source locations;

determine physical location of the audio source based on the estimated source locations and the respective likelihood values; and output the physical location of the audio source.

17. The at least one non-transitory computer readable medium of claim 16, wherein the computer readable instructions are to cause one or more of the at least one processor circuit to:

compare the respective likelihood values corresponding to the estimated source locations; and select the first one of the estimated source locations to represent the physical location of the audio source based on the comparison of the respective likelihood values.

18. The at least one non-transitory computer readable medium of claim 17, the first one of the estimated source locations has a highest likelihood value among the respective likelihood values corresponding to the estimated source locations.

19. The at least one non-transitory computer readable medium of claim 16, wherein the computer readable instructions are to cause one or more of the at least one processor circuit to calculate the first individual error based on a difference between a first distance and a second distance, the first distance determined based on time difference of arrival (TDOA) data and the second distance determined based on microphone positional data.

20. The at least one non-transitory computer readable medium of claim 19, wherein a number of the microphones is greater than 5.

* * * * *